No. 639,290. Patented Dec. 19, 1899.
J. B. RHODES.
WATER CLOSET.
(Application filed May 12, 1899.)
(No Model.) 2 Sheets—Sheet 2.
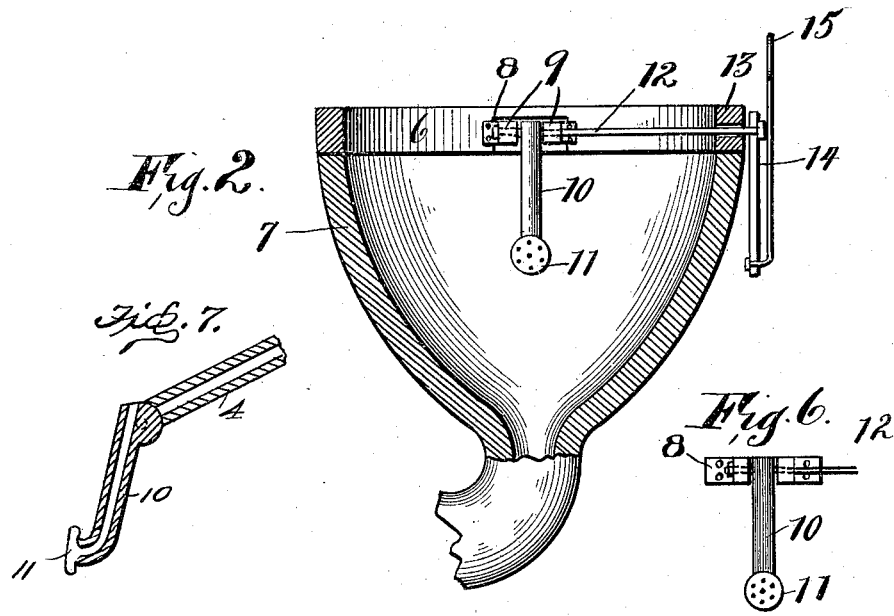
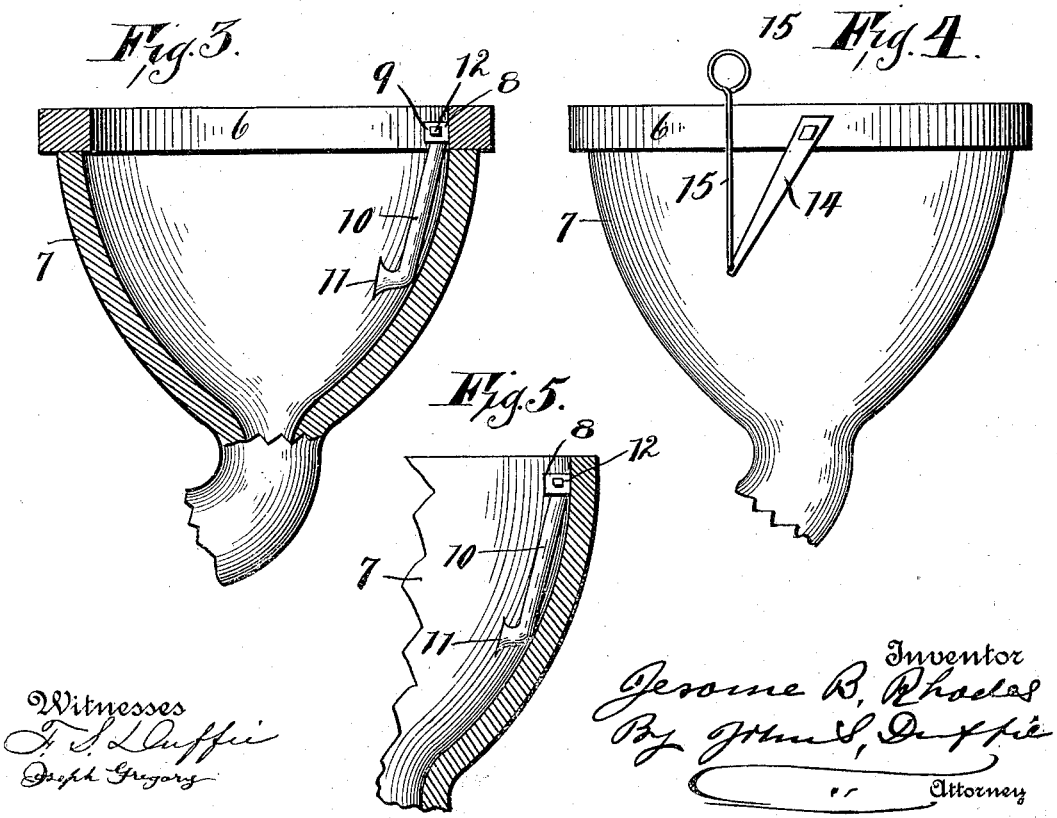
Witnesses
F. S. Duffie
Joseph Gregory
Inventor
Jerome B. Rhodes
By John S. Duffie
Attorney

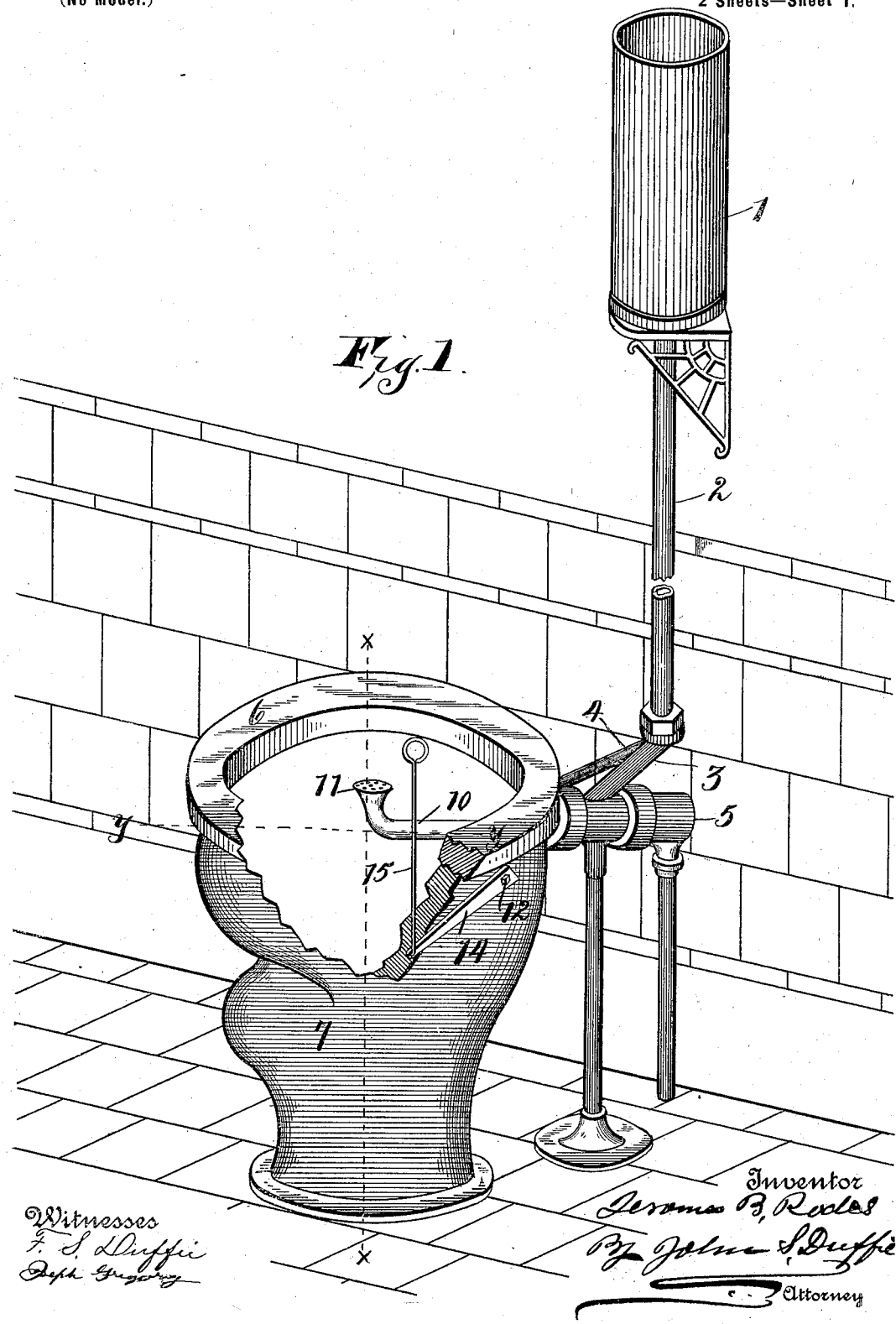

UNITED STATES PATENT OFFICE.

JEROME BONAPARTE RHODES, OF SHREVEPORT, LOUISIANA.

WATER-CLOSET.

SPECIFICATION forming part of Letters Patent No. 639,290, dated December 19, 1899.

Application filed May 12, 1899. Serial No. 716,572. (No model.)

*To all whom it may concern:*

Be it known that I, JEROME BONAPARTE RHODES, a citizen of the United States, residing at Shreveport, in the parish of Caddo and State of Louisiana, have invented certain new and useful Improvements in Water-Closets, of which the following is a specification.

My invention is an improvement in water-closets, and does not so much apply to the closet itself as to an attachment thereto.

The attachment consists of a tube so connected with the closet as to be used, when desired, to spray and wash the rectum, which is sometimes very important when that part of the human body is diseased.

In the accompanying drawings, Figure 1 is a perspective view of a water-closet with wood casing and the sink or bowl partly cut away in order to show my spray-pipe in position. The means for operating the same is shown on the outside of the bowl. Fig. 2 is a cross-sectional view of the wooden rim and of the sink or bowl cut on the line $xx$ of Fig. 1, showing the spray-pipe down and resting against the back of the sink or bowl. Fig. 3 is a cross-sectional view of the wooden rim and sink or bowl cut on the line $yy$ of Fig. 1. Fig. 4 is a perspective view of the wooden rim and sink or bowl, showing means for operating the spray-pipe. Fig. 5 shows a part of the sink or bowl in section with a bracket on the inside, in which the spray-pipe is hinged. Fig. 6 is a face view of the bracket and of the spray-pipe hinged therein. Fig. 7 is a longitudinal sectional view of pipes 4 and 10.

My invention is described as follows:

1 is the reservoir.

2 and 3 are the water-pipes leading from the reservoir.

4 is the pipe to supply the spray-pipe; but the spray-pipe may be supplied from a branch in the barrel 5, where it unites or comes in contact with the sink or bowl.

6 is the wooden rim of the sink or bowl, and 7 is the sink or bowl.

On top of the sink or bowl is the stationary wooden rim 6, and to the rear part of this wooden rim and to the inner wall thereof is secured a bracket 8. This bracket is provided with perforated lugs 9, in which is hinged the spray-pipe 10, terminating in a spray 11. This spray-pipe is so connected with this bracket and the tube 4, that conducts water to it, that when it is down, as shown in Figs. 2, 3, and 7, the water-supply is cut off and when it is up the supply is on. This arrangement may be similar to like arrangements to faucets usually found in bowls in water-closets, which turn the water off by turning the mouth of the faucet beyond the edge of the bowl, and therefore for this construction I make no claim for novelty. This spray-pipe is hinged between the lugs 9 of the bracket 8 by means of a rod 12, the free end of which passes horizontally out through the perforation 13 in the wooden rim 6. To the outer end of this rod 12 is secured an arm 14, and to the free end of this arm is pivoted a lifting-rod 15, which passes up beyond the top of the wooden rim 6 and through any woodwork that may be on the top of such rim.

When it is not desirable to use the wooden rim 6, four small holes may be drilled through the sink or bowl and a larger one for the supply-pipe 4, and the bracket 8 may be secured to the back wall of the sink or bowl by means of bolts, and it may also be cemented thereto, or it may be cemented thereto without the use of bolts.

In the ordinary use of the sink or bowl this spray-pipe is not in the way and does not become soiled, as it lies close to the back of the sink or bowl.

When we wish to spray the rectum, we take hold of the rod 15 and pull it up, and this throws the spray-tube 10 in position, as shown in Fig. 1.

Having described my invention, what I claim as new, and desire to secure by Letters Patent, is—

In combination with a water-closet, substantially as shown, the pipe 4, connected with the main water-pipe 3, and passing to the interior of the sink or bowl, 7; bracket 8, having perforated lugs 9, secured to the inner wall of the sink or bowl; spray-pipe 10, hinged between the perforated lugs 9, its rear end connecting with the lower end of pipe 4; rod 12, secured to said spray-pipe and passing out horizontally through the sink or bowl; arm 14, secured to said rod 12, and lifting-rod 15, pivoted to the free end of said arm 14, substantially as shown and described and for the purposes set forth.

In testimony whereof I affix my signature in presence of two witnesses.

JEROME BONAPARTE RHODES.

Witnesses:
H. P. WELLS, Jr.,
C. H. JACKSON.